United States Patent
Martin et al.

(10) Patent No.: US 7,295,638 B2
(45) Date of Patent: Nov. 13, 2007

(54) COMMUNICATION DEVICE

(75) Inventors: Frederick L. Martin, Plantation, FL (US); Edgar H. Callaway, Boca Raton, FL (US); Paul E. Gorday, West Palm Beach, FL (US); David B. Taubenheim, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 353 days.

(21) Appl. No.: 10/715,222

(22) Filed: Nov. 17, 2003

(65) Prior Publication Data

US 2005/0105595 A1 May 19, 2005

(51) Int. Cl.
- H03D 1/06 (2006.01)
- H03D 11/04 (2006.01)
- H03K 5/01 (2006.01)
- H04B 1/10 (2006.01)
- H04L 1/00 (2006.01)

(52) U.S. Cl. ............ 375/348; 375/238; 375/239; 375/242; 375/256; 375/257; 375/286; 375/353; 307/200.1; 329/300; 329/304; 341/126; 455/130; 455/296

(58) Field of Classification Search ........ 329/300, 329/304; 341/126; 375/238, 239, 242, 256, 375/257, 286, 353, 348; 307/200.1; 455/130, 455/296

See application file for complete search history.

(56) References Cited

U.S. PATENT DOCUMENTS

| | | | | |
|---|---|---|---|---|
| 4,479,255 A * | 10/1984 | Geesen et al. | ............ | 455/234.2 |
| 4,661,790 A * | 4/1987 | Gannon et al. | ............. | 333/234 |
| 5,724,381 A * | 3/1998 | Endo et al. | ................. | 375/149 |
| 5,947,693 A * | 9/1999 | Yang | ............................ | 417/45 |
| 6,154,482 A * | 11/2000 | Inuzuka | ....................... | 375/130 |
| 6,192,068 B1 * | 2/2001 | Fattouche et al. | .......... | 375/130 |
| 6,282,232 B1 * | 8/2001 | Fleming et al. | ............. | 375/147 |
| 6,320,897 B1 * | 11/2001 | Fattouche et al. | .......... | 375/130 |
| 6,340,649 B1 * | 1/2002 | Kawata et al. | .............. | 501/138 |
| 6,377,782 B1 * | 4/2002 | Bishop et al. | ............. | 455/3.01 |
| 6,563,857 B1 | 5/2003 | Shi et al. | | |
| 6,639,939 B1 * | 10/2003 | Naden et al. | ................ | 375/140 |
| 6,970,496 B1 * | 11/2005 | Ben-Bassat et al. | ........ | 375/141 |
| 2003/0031232 A1 | 2/2003 | Shi et al. | | |
| 2003/0108135 A1 * | 6/2003 | Frigon | ........................ | 375/354 |
| 2003/0152137 A1 | 8/2003 | Shi et al. | | |
| 2004/0005020 A1 * | 1/2004 | Dent | ........................... | 375/343 |

OTHER PUBLICATIONS http://www.saw-device.com/pdfs/what_is_a_saw_filter.pdf—Copyright © May 2000 COM DEV International. ("COM DEV"). All Rights Reserved.

(Continued)

*Primary Examiner*—David C. Payne
*Assistant Examiner*—Erin M. File

(57) ABSTRACT

A direct sequence spread spectrum (DSSS) receiver (100) consistent with certain embodiments has a frequency generator (112) that generates a local oscillator signal without use of a piezoelectric crystal. A frequency converter (108) receives the local oscillator signal and mixes the local oscillator signal with a received DSSS signal to produce a down-converted signal. The received DSSS signal is encoded using a first set of DSSS code. A differential chip detector (116) receives the down-converted signal and converts the down-converted signal to a differentially detected signal. A correlator (120) receives the differentially detected signal and correlates the detected signal with a set of DSSS codes that are time-shifted from the first set of DSSS codes. This abstract is not to be considered limiting, since other embodiments may deviate from the features described in this abstract.

31 Claims, 7 Drawing Sheets

OTHER PUBLICATIONS http://www.integritytechnology.net/Resonators/ResonatorTechnote-1.pdf—undated.

Shi, Qicai, Robert J. O'Dea, and Frederick Martin. "A New Chip-level Differential Detection System for DC-CDMA." IEEE International Conference on Communications (ICC), Apr. 2002, pp. 544-547, vol. 1.

Robins, W.P., Phase Noise in Signal Sources (Theory and Applications), Peter Peregrinus Ltd., London, UK, 1980, p. 134.

Krauss, H.L. et al., Solid State Radio Engineering, John Wiley & Sons, Inc., 1980, pp. 179-180.

* cited by examiner

COMMUNICATION DEVICE

BACKGROUND

In RF transceivers today, the use of a reference clock or oscillator derived from a quartz crystal reference element is nearly ubiquitous. The performance advantages of this approach lie in the high frequency accuracy of piezoelectric quartz crystal resonators (on order of parts per million) and on the low-noise signal produced by the devices. For many applications, the cost and size of reference frequency generation hardware for implementations of this approach make up only a small fraction of the total cost of the communications equipment.

However, for other devices including, but not limited to, a new class of receivers, transmitters and transceivers which are being developed for short-range, low bit-rate applications such as wireless sensing, logistics and game controls, the cost of a crystal reference can represent a substantial percentage (e.g., 10% to 30%) of the total cost of the transceiver. Furthermore, while the cost of the integrated portions of the transceiver are expected to decrease substantially over time, the crystal cost is unlikely to decrease at the same rapid rate. Thus, the cost of the crystal as a percentage of the total cost of the transceiver may actually tend to increase over time.

Crystal reference elements do not currently lend themselves to integration on a silicon substrate with other circuit elements. This is because high quality factor (Q) resonators of the type used in reference elements are constructed from piezoelectric materials such as quartz that are not compatible with the silicon-based materials used in semiconductors. The crystal is, therefore, implemented as a discrete element outside of the integrated circuitry used to implement other elements of the device. The fact that the crystal is implemented as a discrete element has negative implications for both the cost and size of the transceiver.

Several communication techniques utilize circuitry that does not rely upon crystals for frequency stability as follows:

Inductive-Capacitive (LC) tuned receivers. While crystal reference circuits are common in modem communications equipment, equipment manufactured before 1980 sometimes utilized tuned LC (Inductor-Capacitor) circuits for frequency generation. Several examples of this are broadcast television receivers, broadcast radio receivers and short-wave radio receivers. Common elements in all of these systems are analog transmission format and high ratios of signal bandwidth to carrier frequency. Such applications are used only for analog formats.

Wideband Frequency-Shift Keying (FSK). While few commercial applications are in use, digital FSK systems with high modulation index exhibit tolerance to frequency offset. This class of system has support for digital modulation and can be made to support arbitrarily high ratios of carrier frequency to data rate. However, systems employing wideband FSK are inefficient in their spectral usage, since the occupied frequency band of the signal may be used by only a single user at a time. Furthermore, because the energy density of the wideband FM signal is not uniform across the frequency band, regulatory issues may arise with peak power density.

XOR-based processing of DSSS signals. In this approach, as described in U.S. Pat. No. 5,559,828, a DSSS (Direct Sequence Spread Spectrum) sequence is de-spread using an XOR (exclusive-OR) gate and a delay line. While this is effective in increasing tolerance to frequency offset, it does not produce coding gain and does not differentiate between codes, decoding all signals equally. Thus, several advantages of DSSS systems, including coding gain, code-division multiple access, and use of multiple codes in orthogonal modulation schemes, are lost using XOR processing.

None of these techniques is entirely suitable for use in certain digital communication systems such as, for example, those compatible with IEEE 802.15.4.

BRIEF DESCRIPTION OF THE DRAWINGS

Certain embodiments illustrating organization and method of operation, together with objects and advantages may be best understood by reference to the detailed description that follows taken in conjunction with the accompanying drawings in which.

DETAILED DESCRIPTION OF EXEMPLARY EMBODIMENTS

Figure 1:
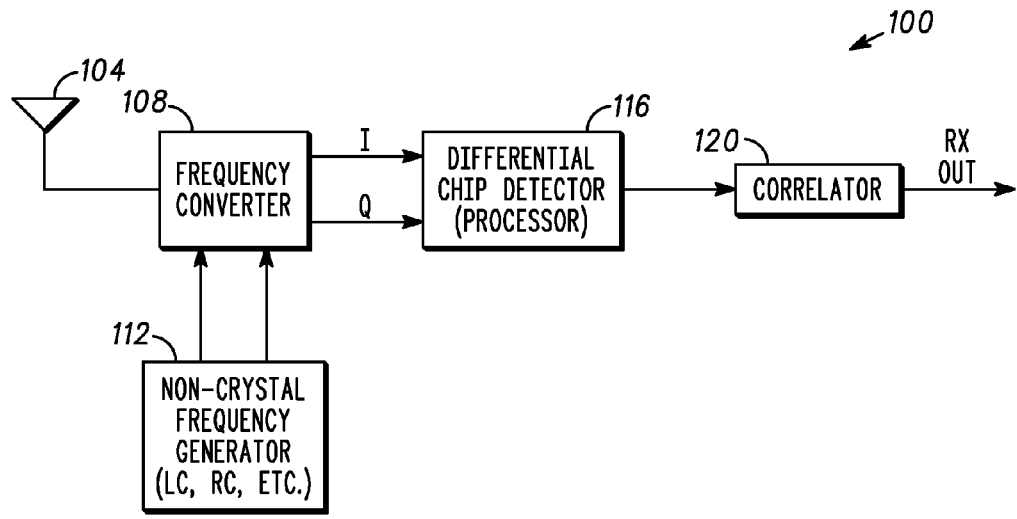
FIG. 1 is a block diagram of a radio frequency receiver consistent with certain embodiments.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Crystals are used as frequency determining elements in various devices such as transceivers due to their high accuracy and low noise levels. If a technique were developed by which a transceiver can be made to be tolerant of relatively wide frequency variation and high noise levels in its frequency reference, this would allow the implementation of a frequency reference without the use of high-Q piezoelectric materials. The resulting circuit could be implemented on an integrated circuit if desired, resulting in a significant cost and size savings in transmitters, receivers and transceivers for certain applications.

FIG. 1 depicts a block diagram of a receiver device 100 consistent with certain embodiments. In this exemplary embodiment, a DSSS signal is received at antenna 104 and passed to a frequency converter circuit 108 for down-conversion. The frequency converter (e.g., mixer) 108 utilizes a local oscillator in the form of a non-crystal based frequency generator 112 which produces a signal which is mixed with the incoming signal from antenna 104 to produce the output of the frequency converter 108. This output from the frequency converter is coupled to a differential chip detector 116, which is defined herein as a detector circuit. Differential chip detection as described in this patent application is described in detail in Q. Shi, R. J. O'Dea, and F. Martin, "A New Chip-Level Detection System for DS-CDMA," 2002 IEEE International Conference on Communications, vol. 1, pp. 544-547, 2002. This document shows that differential chip detection can increase the tolerance of a receiver to frequency offset. However, it was not recognized that the same mechanism could also be utilized to mitigate the effect of low-frequency noise (i.e., phase noise/close-in noise) on the receive Local Oscillator (LO) or transmit carrier signal, thus facilitating use of a crystal-less oscillator. The mitigation of low frequency noise on the local oscillator and/or carrier oscillators will be explained and proven in the discussion accompanying FIG. 5.

It should be noted that signal types other DSSS may also be used in certain embodiments consistent with this invention including, but not limited to, general frequency-modulated signals, phase-modulated signals or chirp spread spectrum signals. In this case the differential chip detection block is more generally described as a differential detection block, for which the delay element (see 278 of FIG. 5) represents some desired detection time difference. The process of differentially detecting the signal prior to correlation (i.e., symbol matched filtering) is fundamentally responsible for the mitigation of both frequency offsets and close-in LO phase noise.

Briefly, in certain embodiments of differential chip detection, the output of the down-converter is conjugated and delayed by a period of time equal to the period of N direct sequence chips, where N is preferably 1. A complex multiplication is then performed on the original and delayed conjugate versions of the signal to produce the detector output (see 270 of FIG. 5).

It will be seen that the resulting signal after processing by a differential detection process has several interesting properties: (1) the impact of frequency offset between receive local oscillator (LO) and transmit carrier frequencies is substantially eliminated; and (2) low-frequency (frequencies below the chip rate) phase noise artifacts from the transmit carrier and receive LO are substantially eliminated.

By taking advantage of property (1), it is possible to increase the tolerance of the receiver to frequency offset between the transmit carrier and receive LO. By additionally taking advantage of property (2), it is possible to relax the close-in noise requirement on the receive and transmit oscillators. Together, these properties permit the omission of high performance oscillators based on piezoelectric crystal elements in certain communication environments, such as for low power, short range relatively low bit rate, relatively low duty cycle communication systems.

Again referencing FIG. 1, in the down-conversion operation (either single- or multiple-conversion), the radio frequency (RF) DSSS signal is converted to a complex baseband I/Q representation through the use of a quadrature mixer 108. The local oscillator (LO) frequency generator 112 for the mixer 108 is generated directly or via frequency synthesis from an RF oscillator. Because of the relaxed requirements for frequency accuracy and close-in noise in the receiver 100 compared to conventional receivers, the frequency generator 112 may be constructed from an LC (inductive/capacitive) type oscillator, an RC (resistive/capacitive) type oscillator, a relaxation oscillator, a ring oscillator, or any other suitable oscillator circuit that does not require a high stability piezoelectric resonator element, so long as the oscillator has reasonably good stability.

The output of the down-conversion operation is a complex baseband signal with sequences of direct sequence spreading codes that were modulated onto the RF carrier at the transmitter. The complex baseband signal may also have a frequency offset term which represents the difference in frequency of the transmit carrier and the receiver local oscillator. Additionally, the complex baseband signal may exhibit artifacts of low-frequency noise that were present on the transmit carrier or receiver local oscillator.

The signal at the output of the differential chip detect block 116 is a complex baseband representation of the DSSS signal sent to the receiver from a transmitter. Frequency offset and oscillator-induced low-frequency phase noise have been substantially eliminated. What remains is to recover the information modulated at the transmitter by de-spreading the DSSS signal. This is accomplished through the process of correlation, which is carried out in correlator 120.

If the DSSS codes are differentially encoded prior to modulation at the transmitter (see 220 and 224 of FIG. 5), then the differential chip detect block 116 produces the DSSS codes at its output, and the correlator 120 will correlate to the DSSS codes. If the DSSS codes are not differentially encoded at the transmitter (as in the paper by Shi, et. al.), then the differential chip detect block 116 produces modified DSSS codes at its output, and the correlator 120 will correlate to the modified DSSS codes. The modified codes may be calculated in advance by passing the DSSS codes through the same differential chip detection operation used by the differential detect block 116 (see 270 of FIG. 5).

Thus, a direct sequence spread spectrum receiver 100 consistent with certain embodiments has a frequency generator 112 that generates a local oscillator signal without use of a piezoelectric crystal. A frequency converter 108 receives the local oscillator signal and mixes the local oscillator signal with a received DSSS signal to produce a down-converted signal. The received DSSS signal is encoded using at least one first DSSS code. A differential chip detector 116 receives the down-converted signal and produces a detected signal while substantially eliminating frequency offsets and low frequency phase noise. A correlator 120 receives the differentially detected signal and correlates the differentially detected signal with one or more DSSS codes to produce decision statistics for determining the transmitted information.

This arrangement provides for a method for processing a digitally-modulated radio signal to facilitate high tolerance to frequency offset and oscillator noise while preserving spectral re-use through Code-Division Multiple Access (CDMA), uniform energy density across the signal bandwidth and an arbitrarily high ratio of carrier frequency to bit rate. Thus, a direct sequence spread spectrum (DSSS) communication method consistent with certain embodiments involves generating a local oscillator signal without use of a piezoelectric crystal; mixing the local oscillator signal with a received DSSS signal to produce a down-converted signal, wherein the received DSSS signal is encoded using a first set of DSSS codes; differentially decoding the down converted signal to create a differentially decoded signal; and correlating the decoded signal with a second set of DSSS codes.

In certain embodiments, the above wireless receiver can be implemented using an RF receiver for receiving the signal and converting it to a baseband representation at 108. The RF receiver has a local oscillator frequency generator 112 based on an oscillator without a piezoelectric crystal element. A processing block 116 (e.g., the differential chip detector) produces output chips that are a function of successive chips of the input signal. The correlator block 120 correlates the DSSS signal at the output of the processing block to a DSSS code word that has been derived from the transmitted code word.

Generally speaking, but not by way of any limitation, the code length may determine how well the system performs. For better performance in a system such as that described above, the code length tends to be somewhat long. The frequency offset tolerance has been found experimentally to be approximately 0.12/T, where T is the period of a chip in the spreading code sequence. For a given data rate, a higher chip rate results in a smaller chip period and a higher tolerance to frequency offset. Additionally, it is noted that the differential chip detect mechanism may result in a degradation in receiver sensitivity. For certain exemplary implementations, the degradation has been observed to be approximately 3 to 10 dB compared to conventional receivers. The sensitivity loss is primarily the result of the multiplicative action of the differential chip detect block 116, which enhances noise for the case of negative signal-to-noise ratios. Thus, these factors should be taken into consideration when using the present teachings as the basis for a communication system.

Figure 2:
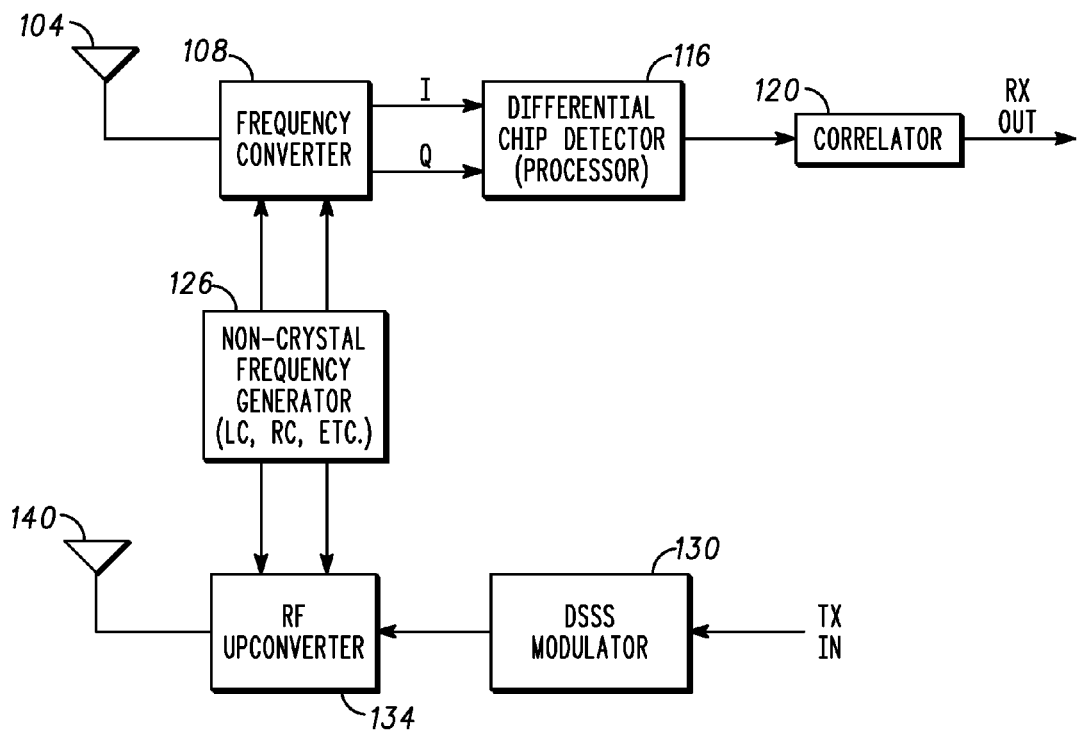
FIG. 2 is a block diagram of a radio frequency transceiver consistent with certain embodiments.

In addition to providing for a receiver device, a transmitter may similarly be produced as depicted, for example, in FIG. 2, by use of frequency generator 126 that serves as an RF source for generating a transmitter RF carrier signal. In this example, the frequency generator 126 also serves as the local oscillator for the receiver. The frequency generator 126 may include a frequency generator based on an oscillator without a piezoelectric element, such as an LC or RC (Resistive-Capacitive) controlled frequency generator. A DSSS modulator 130 is used to modulate the message to be transmitted onto the RF carrier generated by frequency generator 126 with a known DSSS code word. The RF up-converter 134 uses the RF carrier signal generated by the frequency generator 126 (serving as an RF source) to convert the signal from the DSSS modulator 130 to the desired radio frequency and, in the example shown, provides the amplification desired for transmission over antenna 140. In this embodiment, frequency generator 126 is shared between receiver and transmitter portions of the transceiver.

The transmitter presented here tends to produce a spectrum with uniform energy density. Because direct sequence spread spectrum techniques are used, it is possible to support multiple users in a single frequency space.

Figure 3:
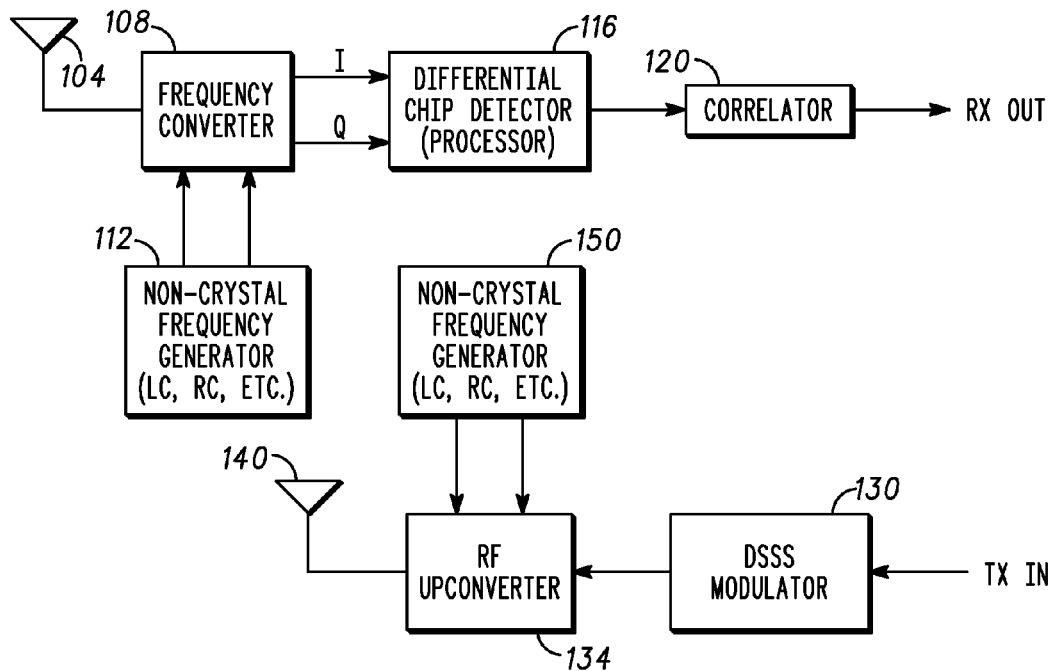
FIG. 3 is a block diagram of another radio frequency transceiver consistent with certain embodiments.

FIG. 3 depicts another variation in which the frequency generator of the transmitter and receiver are maintained separately (The transmitter and receiver can be commonly housed to form a transceiver or can be separate physical devices.). In this example, frequency generator 112 generates the local oscillator signal used in the down-conversion process for the receiver. Frequency generator 150 serves as the RF source that generates the RF carrier signal used by the up-converter 134 of the transmitter.

Thus, a Direct Sequence Spread Spectrum (DSSS) communication transmitter consistent with certain embodiments has an RF source that generates a transmitter carrier signal, wherein the RF source uses an oscillator that generates the RF transmitter carrier signal without use of a piezoelectric element. A DSSS modulator modulates a message to be transmitted onto the transmitter carrier signal using at least one known DSSS code word.

Many variations of the basic structures shown are possible. For example, the frequency generators can be any suitable type of non-piezoelectric resonator based oscillator such as an LC type oscillator, an RC type oscillator, a relaxation oscillator or a voltage-controlled oscillator, or any of the other types of oscillators previously mentioned or other oscillators that do not depend upon a high-Q piezoelectric crystal element as long as the oscillator produces an adequately stable signal for the system definition.

There may be other forms of differential detection than the differential chip detection described herein. For purposes of this document, differential chip detection includes any form of processing that includes 1) a DSSS sequence, 2) a processor that operates on versions of the received signal at different delay times, and 3) a correlation operation. This processing produces a digitally modulated signal, where the information is first coded with an arbitrarily high coding rate, and then the coded bits, or "chips", are used to modulate the phase or frequency of transmitted signal. The receiver differentially processes the received signal to determine the phase-modulated (or frequency-modulated) chip information. Differential phase detection leads to relaxation of stability and phase noise requirements. Finally, a decoder is used to recover information bits from the chip sequence.

The down-conversion process in the receiver can be accomplished by many techniques, such as using multiple-conversion receiver techniques rather than the single conversion example shown. Also, the differential chip detection can be made to operate on an IF signal instead of a pure baseband signal by employing an under-sampled technique. The method could be extended to ultra-wideband (UWB) systems without explicit carrier signals by recognizing the duality between carrier frequency in a conventional system and pulse timing in a UWB system.

Figure 4:
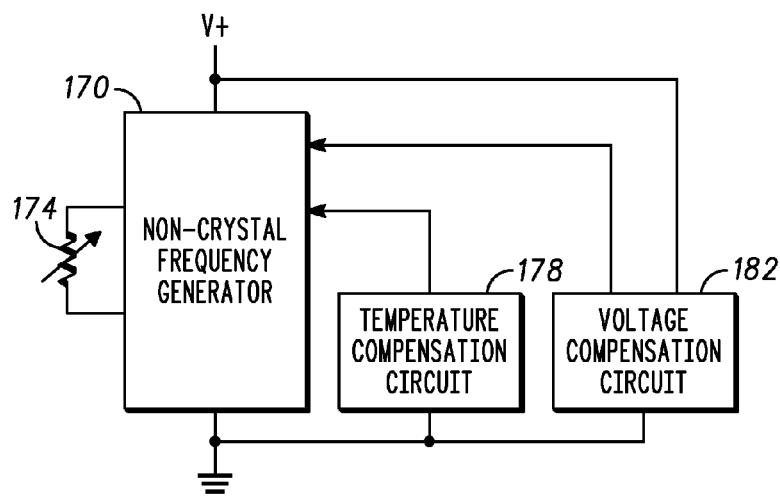
FIG. 4 is a block diagram of an example oscillator consistent with certain embodiments.

FIG. 4 depicts a generalized oscillator circuit that can serve as either a transmitter or receiver oscillator based upon a non-crystal design. The oscillator itself is shown as frequency generator 170 and can incorporate any suitable mechanism for initial adjustment of the oscillator frequency in certain embodiments, such as for example, a variable resistor 174 for an RC based oscillator (or variable capacitor, variable inductor, or binary code input, etc.). The frequency generator may incorporate compensation circuitry 178 for temperature compensation as well as a compensation circuit 182 to compensate the circuitry for changes in supply voltage.

One alternative for generating a receiver local oscillator (LO) or transmit carrier is to use a voltage controlled oscillator (VCO). The VCO might include a D/A converter or other mechanism for frequency adjustment. The frequency adjustment can be used to set the initial frequency of the oscillator for reduction or elimination of manufacturing tolerance in the oscillator. It could also be used along with a voltage or temperature sensor for frequency compensation as illustrated generally in FIG. 4.

Another alternative is to use a phase locked loop (PLL) as the frequency generator. The frequency generator can be configured as a PLL synthesizer (including VCO) with a reference created from a crystal or other stable reference. The PLL locking mechanism could be used to initially tune the VCO. Once tuning is achieved, the remainder of the PLL could be switched off and the VCO allowed to free run— thus, after the PLL is switched off, the VCO would operate as a frequency generator that generates a local oscillator signal without use of a piezoelectric crystal. This would not save the cost of the PLL but it would save the power to operate the PLL in normal operation. This approach could also be modified to use a crystal-less oscillator as a reference frequency generator. This would save cost compared to a crystal. The advantage of this approach would be in allowing the crystal-less reference to be implemented at a lower frequency for better component matching and, therefore, better frequency accuracy.

When frequency offsets are encountered outside the frequency tolerance of the receiver, an acquisition scheme can be utilized as described in U.S. patent application Ser. No. 10/678,416, filed Oct. 3, 2003, to Callaway, et al entitled "Sync Bursts for Frequency Offset Compensation". In this technique, a transmission protocol is implemented that uses a sequence of short synchronization bursts prior to a packet, or prior to an exchange of multiple packets. The synchronization bursts can be sent sequentially, each having a fixed frequency offset from the center frequency of the transmitter. The set of sync bursts will span the expected range of frequency offsets between transmitter and receiver, such that an active receiver will receive at least one of them. The receiver then modifies its center frequency, according to the information contained within the frequency burst, such that the difference between the transmitter and receiver center frequencies is within acceptable tolerance for the modulation format.

Figure 5:
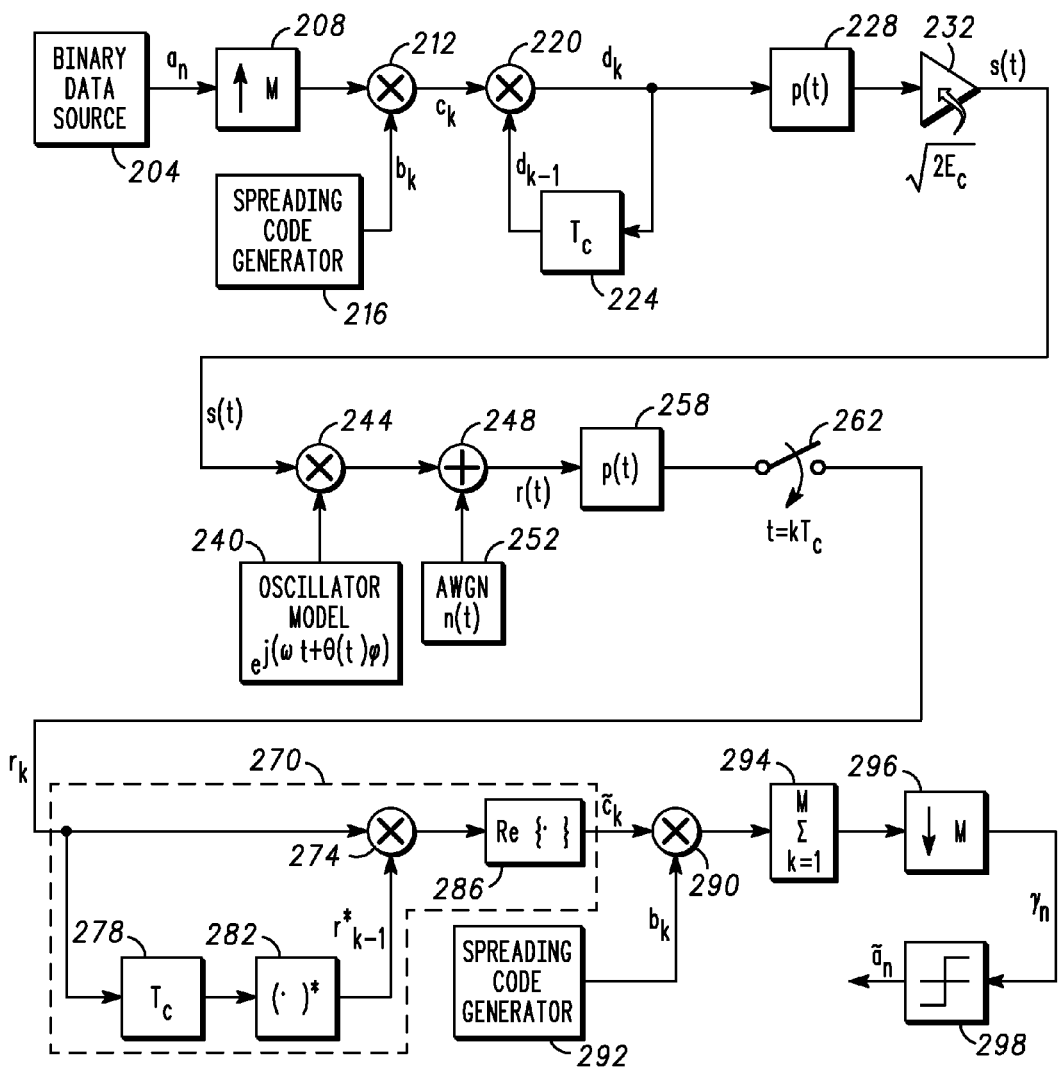
FIG. 5 is a block diagram of a communication system used to model the noise performance of a differential chip detector consistent with certain embodiments.

In order to demonstrate the cancellation of phase noise, consider the circuit diagram of an exemplary system using a differential chip detector as shown in FIG. 5. FIG. 5 shows a block diagram used to model a DSSS BPSK (binary phase shift keying) system model having a modulator with differential chip encoding, a simple AWGN (Additive White Gaussian Noise) channel with local oscillator (LO) impairments, and a demodulator with differential chip detection. In the modulator, binary data symbols from source 204 $\alpha_n \in \{\pm 1\}$ are up-sampled by a factor M at up-sampler 208, where M represents the DSSS spreading factor. The up-sampled data sequence is multiplied at multiplier 212 by periodic spreading sequence $b_k \in \{\pm 1\}$ generated by spreading code generator 216 to form the modulated chip sequence $c_k$. Without loss of generality, it will be assumed that the period of $b_k$ is equal to M such that each data symbol contains a full period of the spreading sequence. Next, the chip values are differentially encoded using multiplier 220 and delay 224 and mapped to transmit pulses at pulse shaper 228 using the square-root-raised-cosine (SRRC) pulse shape p(t) of unit energy and rolloff factor α. A gain factor of the square root of $2E_c$ is applied at amplifier 232, so that the complex envelope of the transmitted signal can be expressed as $$s(t) = \sqrt{2E_c} \sum_k d_k p(t - kT_c) \qquad (1)$$

where $T_c$ is the chip period, $E_c$ is the chip energy, and $E_b = ME_c$ is the energy per data bit. It is noted that the DSSS Modulator 130 of FIG. 2 corresponds to blocks 208, 212, 216, 220, 224, 228, and 232. RF up-converter 134 includes 244, while oscillator 240 corresponds to frequency generator 126. Thus, everything from the upsampler 208 through the amplifier 232 of FIG. 5 belongs in the DSSS modulator 130 of FIGS. 2-3. The oscillator 240 and mixer 244 in FIG. 5 represent the combined frequency offset and phase noise contributions of both the RF up-converter 134 and frequency converter 108. Block 270 in FIG. 5 represent differential chip detector 116 in FIGS. 1-3. Other components in FIG. 5 (248, 252, 258, and 262) can be considered part of the frequency converter 108 of FIGS. 1-3.

To proceed with the analysis, the transmitted signal s(t) is subjected to local oscillator impairments, including frequency offset ω, phase offset φ, and phase noise θ(t) from oscillator model 240 through multiplier 244, and the result is summed at summer 248 with noise signal, n(t), from AWGN generator 252. (Note that the oscillator model 240 models the non-crystal frequency generators 112, 126, 150, 170 in FIGS. 1-4.) The complex envelope of the received signal is $$r(t) = s(t)e^{j(\omega t + \theta(t) + \varphi)} + n(t) \qquad (2)$$
$$= s(t)e^{j\beta(t)} + n(t)$$

where β(t) represents the composite phase signal of the local oscillator model. The additive noise, n(t), is the complex envelope of bandpass noise with two-sided power spectral density $N_o/2$. In general n(t) represents receiver thermal noise, but under certain conditions it may also include multiple access interference. The received signal r(t) is filtered by a chip matched filter (CMF) 258 with pulse shape p(t) and optimally sampled at sampler 262 once per chip ($t = kT_c$) to produce the received sequence $r_k$.

The received sequence $r_k$ is passed through a differential chip detector 270 having a multiplier 274 that multiplies the received sequence $r_k$ by a signal created by taking a delayed version (a delay of $T_c$ at delay 278) of the received sequence $r_k$ and then taking the complex conjugate of that signal at complex conjugator 282. The real part of the resulting signal is taken at block 286 to produce estimates $\tilde{c}_k$ of the modulated chip sequence, which is subsequently de-spread at multiplier 290 using a synchronized local copy of the spreading sequence $b_k$ from spreading code generator 292. Finally, the de-spread sequence is integrated over each data symbol period at block 294, down-sampled at down-sampler 296, and the result $\gamma_n$ is passed to a decision threshold 298 to obtain estimates $\alpha_n$ of the binary data symbols.

Differential chip detector 270 can be used to implement the differential chip detector (processor) 116 described with reference to FIGS. 1-3.

In order to estimate BER performance of the system of FIG. 5, several assumptions and approximations are made in order to keep the exemplary model simple. The validity of the model can then be tested by comparison to system simulation results.

Begin with the sampled output of the CMF 258. The use of SRRC pulse shaping, along with an assumption of ideal chip timing, usually leads to received chip samples $r_k$ that are free from inter-chip interference (ICI). To maintain this property in the presence of frequency offset and phase noise, it will be assumed that the phase signal $\beta(t)$ varies slowly with respect to the chip rate. Thus, the received sequence can be expressed as $$r_k = \sqrt{2E_c} d_k e^{j\beta_k} + n_k \quad (3)$$

The noise samples $n_k$ are assumed to be uncorrelated zero-mean complex Gaussian random variables with variance $\sigma_n^2 = 2N_o$. The noise can also be expressed using real and imaginary parts, $n_k = x_k + jy_k$, where $x_k$ and $y_k$ are real, uncorrelated, zero-mean Gaussian random variables with variance $\sigma_x^2 = \sigma_y^2 = N_o$.

Given the received sequence (3), the output of the differential chip detection can be expressed as $$\tilde{c}_k = \mathrm{Re}\{r_k r_{k-1}^*\} \quad (4)$$

$$= \mathrm{Re}\{2E_c d_k d_{k-1}^* e^{j(\beta_k - \beta_{k-1})} + \sqrt{2E_c} n_k d_{k-1}^* e^{-j\beta_{k-1}} + \sqrt{2E_c} d_k e^{j\beta_k} n_{k-1}^* + n_k n_{k-1}^*\}$$

Using the desired differential detection result, $c_k = d_k d_{k-1}^*$, and the observation that the chip sequences $c_k$ and $d_k$ are real valued, equation (4) reduces to $$\tilde{c}_k = 2E_c c_k \cos(\Delta\beta_k) + z_k \quad (5)$$

where $\Delta\beta_k$ is the phase difference between successive chips, and $z_k$ is the overall noise component.

The chip phase difference $\Delta\beta_k$ is a function of the frequency offset and phase noise.

$$\Delta\beta_k = \beta_k - \beta_{k-1} \quad (6)$$

$$= \omega T_c + \theta_k - \theta_{k-1}$$

$$= \omega T_c + \Delta\theta_k$$

The differential phase noise $\Delta\theta_k$ is assumed to be a zero-mean Gaussian random variable with variance $\sigma_{\Delta\theta}^2$. Thus, $\Delta\beta_k$ is Gaussian with mean value equal to the frequency offset term $\omega T_c$. The composite additive noise in (5) is given by $$z_k = x_k x_{k-1} + y_k y_{k-1} + \sqrt{2E_c}\{d_{k-1}(x_k \cos\beta_{k-1} + y_k \sin\beta_{k-1}) + d_k(x_{k-1}\cos\beta_k + y_{k-1}\sin\beta_k)\} \quad (7)$$

where $z_k$ is a zero-mean random variable, whose variance can be evaluated as $$\sigma_z^2 = \sigma_x^4 + \sigma_y^4 + 2E_c \left\{ \begin{array}{l} \sigma_x^2 \overline{\cos^2\beta_{k-1}} + \sigma_y^2 \overline{\sin^2\beta_{k-1}} \\ +\sigma_x^2 \overline{\cos^2\beta_k} + \sigma_y^2 \overline{\sin^2\beta_k} \end{array} \right\} \quad (8)$$

$$= 2N_o^2 + 4E_c N_o$$

With minor effort, the noise samples $z_k$ can be shown to be uncorrelated.

After de-spreading and integrating over the M-sample data symbol period, the decision statistic becomes $$\gamma_n = 2a_n E_b \frac{1}{M} \sum_{k=1}^{M} \cos(\Delta\beta_k) + \sum_{k=1}^{M} z_k \quad (9)$$

$$= 2a_n E_b \varepsilon_n + \eta_k$$

where $a_n$ is the desired binary data value, $\varepsilon_n$ is an energy loss factor due to the frequency offset and phase noise, and $\eta_k$ is the integrated noise with variance $\sigma_\eta^2 = M\sigma_z^2$. In the absence of frequency offset and phase noise, $\overline{\varepsilon} = 1$; otherwise $\overline{\varepsilon} < 1$, which effectively reduces the energy per bit. Although samples $z_k$ are not Gaussian, the integrated noise $\eta_k$ may be approximated as Gaussian (using the central limit theorem). This approximation is more accurate for large values of M.

The maximum likelihood (ML) decision rule is specified using knowledge of the conditional probability density functions (PDF's), $f(\gamma_n | \alpha_n = 1)$ and $f(\gamma_n | \alpha_2 = -1)$. In the absence of phase noise, $\varepsilon_n$ will be deterministic and the conditional PDF's will be Gaussian. However, phase noise causes $\varepsilon_n$ to be random, and the resulting conditional PDF's would be difficult, if possible, to obtain in closed form. For large values of M, a simple approximation can be obtained by replacing $\varepsilon_n$ in (9) by its mean value $\overline{\varepsilon}$.

$$\overline{\varepsilon} = \frac{1}{M} \sum_{k=1}^{M} \overline{\cos(\Delta\beta_k)} \quad (10)$$

$$= \overline{\cos(\Delta\beta_k)}$$

$$= \int_{-\infty}^{\infty} \cos(\Delta\beta_k) f_{\Delta\beta}(\Delta\beta_k) d\delta\beta_k$$

where $f_{\Delta\beta}(\Delta\beta_k)$ is the Gaussian PDF of $\Delta\beta_k$. The integral in (10) can be easily evaluated using the characteristic function $\psi(\upsilon)$ of a Gaussian distribution.

$$\overline{\varepsilon} = \mathrm{Re}\{\psi(1)\} = \cos(\omega T_c) e^{-\sigma_{\Delta\beta}^2/2} \quad (11)$$

This result suggests that the overall energy loss is the product of the individual losses due to frequency offset and phase noise.

After replacing $\varepsilon_n$ by its mean value in (9), the conditional PDF's become Gaussian, and the ML decision rule will be Choose: $\tilde{\alpha}_n = 1$ if $\gamma_n \geq 0$ $$\tilde{\alpha}_n = -1 \text{ if } \gamma_n < 0 \quad (12)$$

The bit error probability for this binary decision is [5]

$$P_b = Q\left(\sqrt{\frac{4E_b \overline{\varepsilon}}{\sigma_\eta}}\right) \quad (13)$$

Substituting $\sigma_\eta^2 = M\sigma_z^2$ and (8) into (13) gives $$P_b = Q\left(\sqrt{\frac{2E^2(E_b/N_o)^2}{M + 2(E_b/N_o)}}\right) \quad (14)$$

$$= Q\left(\sqrt{2\left(\frac{E_b}{N_o}\right)_{DCD}}\right)$$

The last expression in (14) is the bit error probability for coherent BPSK, with $(E_b/N_o)_{DCD}$ representing the effective bit-energy-to-noise-density ratio after differential detection.

To evaluate the analytical model presented above, the phase noise characteristics should be specified. In particular, the mean energy reduction $\bar{\epsilon}_n$ defined in (11) will depend on the variance of the differential phase noise $\Delta\theta_k$. Given the power spectral density $P_\theta(f)$ for the local oscillator phase noise, the variance of $\Delta\theta_k$ can be computed as $$\sigma_{\Delta\theta}^2 = 2\int_0^\infty P_\theta(f)|H_{\Delta\theta}(f)|^2\, df \quad (15)$$

$$= 4\int_0^\infty P_\theta(f)[1 - \cos(2\pi f T_c)]\, df$$

where $H_{\Delta\theta}(f)$ is the phase transfer function produced by differential chip detection. A simple $1/f^2$ phase noise characteristic will be considered here, with power spectral density (PSD) given by $$P_\theta(f) = P_\theta(f_o)\left(\frac{f_o}{f}\right)^2 \quad (16)$$

where $P_\theta(f_o)$ is the two-sided PSD level at reference frequency $f_n$. This represents a conservative upper bound for phase noise in frequency generation units having relatively noisy oscillators controlled by phase locked loops. Furthermore, it is assumed that the CMF effectively limits the bandwidth of the phase noise to $\pm\frac{1}{2}T_c$, such that $$\sigma_{\Delta\theta}^2 \approx 4P_\theta(f_o)f_o^2 \int_0^{1/2T_c} \frac{[1 - \cos(2\pi f T_c)]}{f^2}\, df \quad (17)$$

Within the integration limits above, $H_{\Delta\theta}(f)$ has a high-pass characteristic, which explains why differential detection helps suppress close-in local oscillator phase noise. Increasing the chip rate will effectively push the phase noise closer to the low end of this transfer function, thereby realizing a higher degree of noise suppression.

Making the variable change $x = fT_c = f/R_c$, and solving the integral numerically gives $$\sigma_{\Delta\theta}^2 \approx 4T_c P_\theta(f_o)f_o^2 \int_0^{0.5} \frac{[1 - \cos(2\pi x)]}{x^2}\, dx \quad (18)$$

$$= 30.5 T_c f_o^2 P_\theta(f_o)$$

Substituting this result into (11), the mean energy loss produced by frequency offset and phase noise is approximated by $$\bar{\epsilon} = \cos(\omega T_c)\exp\{-15.25 T_c f_o^2 P_\theta(f_o)\} \quad (19)$$

Equations (14) and (19) represent a simple analytical model that allows us to quickly predict performance for a wide range of spreading factors and chip rates.

Computer simulations were performed for the system in FIG. 5. The simulation sampling rate was eight times the chip rate, and chip synchronization was ideal. Maximal length sequences (m-sequences) were selected for the spreading codes, and the SRRC pulse shape was given a rolloff factor of $\alpha=1.0$. The accuracy of the analytical model improves as the spreading factor increases with the analytical model being only slightly optimistic compared with the simulation. Both simulated and analytical results asymptotically approach a 1.5 dB increase in $E_b/N_o$ for each doubling of the spreading factor. This slope is also observed in (14), where for large M the effective bit-energy-to-noise-density ratio after differential detection becomes $$\left(\frac{E_b}{N_o}\right)_{DCD} \approx \frac{1}{M}\left(\frac{\bar{\epsilon}E_b}{N_o}\right)^2 \quad (20)$$

Thus, to maintain a constant bit error probability in (14), each doubling of M is accompanied by $\sqrt{2}$ (or 1.5 dB) increase in $E_b/N_o$. More generally, each K-fold increase in M is accompanied by a $\sqrt{K}$ increase in $E_b/N_o$.

Next, the effects of phase noise and frequency offset are considered. In order to normalize the results, the following ratio is defined for use in (19):

$$K = \frac{f_o^2 P_\theta(f_o)}{R_c} = \frac{f_o^2 P_\theta(f_o)}{MR_b} \quad (21)$$

where $R_c = 1/T_c = MR_b$ is the chip rate of the system and $R_b$ is the bit rate of the system. According to (19) the energy loss due to phase noise is proportional to K. Thus, for a given level of acceptable loss, increasing the chip rate will allow a proportional increase in the phase noise.

To put these results in perspective, consider an example system with $R_b=100$ kb/s, $M=100$, and $R_c=10$ Mc/s. For a BER of $10^{-3}$, this system should have an $E_b/N_o$ of 15.7 dB and a phase noise PSD of $-70$ dBc/Hz at $f_o=1$ MHz. This phase noise level is easily achievable using low-cost integrated VCO devices at reasonable frequencies.

Next, frequency offsets of $0.05R_c$ and $0.1R_c$ are added to the phase noise. The additional loss due to frequency offset is about 0.2 dB for both simulation and analytical results. The loss due to frequency offset ranges from about 1.0 dB to 1.5 dB, and the model accuracy changes slightly due to the assumption of slowly varying phase. Using the same example system as before, $R_b=100$ kb/s and $M=100$, and further assuming a carrier frequency of 2.4 GHz, these results show that for an additional loss of 1 dB, the system can tolerate a frequency offset of 1 MHz (~400 ppm).

Thus, it is apparent in view of the above that chip-level differential detection of DSSS signals helps mitigate the effects of oscillator phase noise as well as frequency offset. For cases where system bandwidth is flexible, increasing the spreading factor improves phase noise tolerance and permits the use of lower-cost, noisier frequency references. Increasing the spreading factor also degrades the SNR performance, but this tradeoff may be acceptable in applications where very low device size and cost are paramount.

Although the simulations and analytical model focused on a DSSS BPSK system with $1/f^2$ phase noise model, the basic conclusions also apply to DSSS systems with other data modulation formats (e.g., M-ary orthogonal) as well as more general phase noise characteristics. The simple analytical model was shown to be useful for predicting system performance, especially for large spreading factors where simulation times can be quite long and it can be easily extended to other systems.

Figure 6:
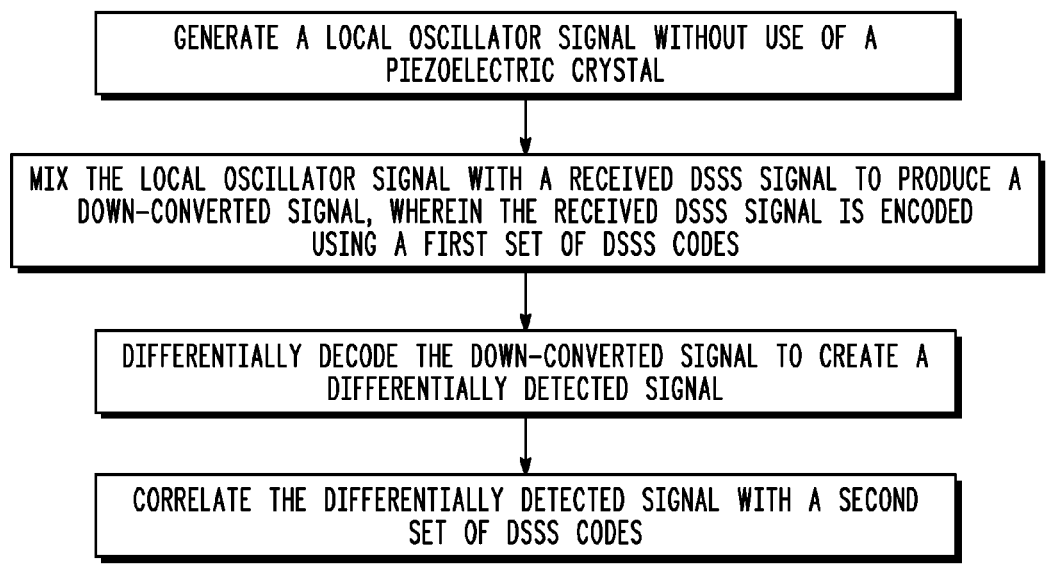
FIG. 6 is a flow diagram of a direct sequence spread spectrum (DSSS) communication method consistent with certain embodiments.
Figure 7:
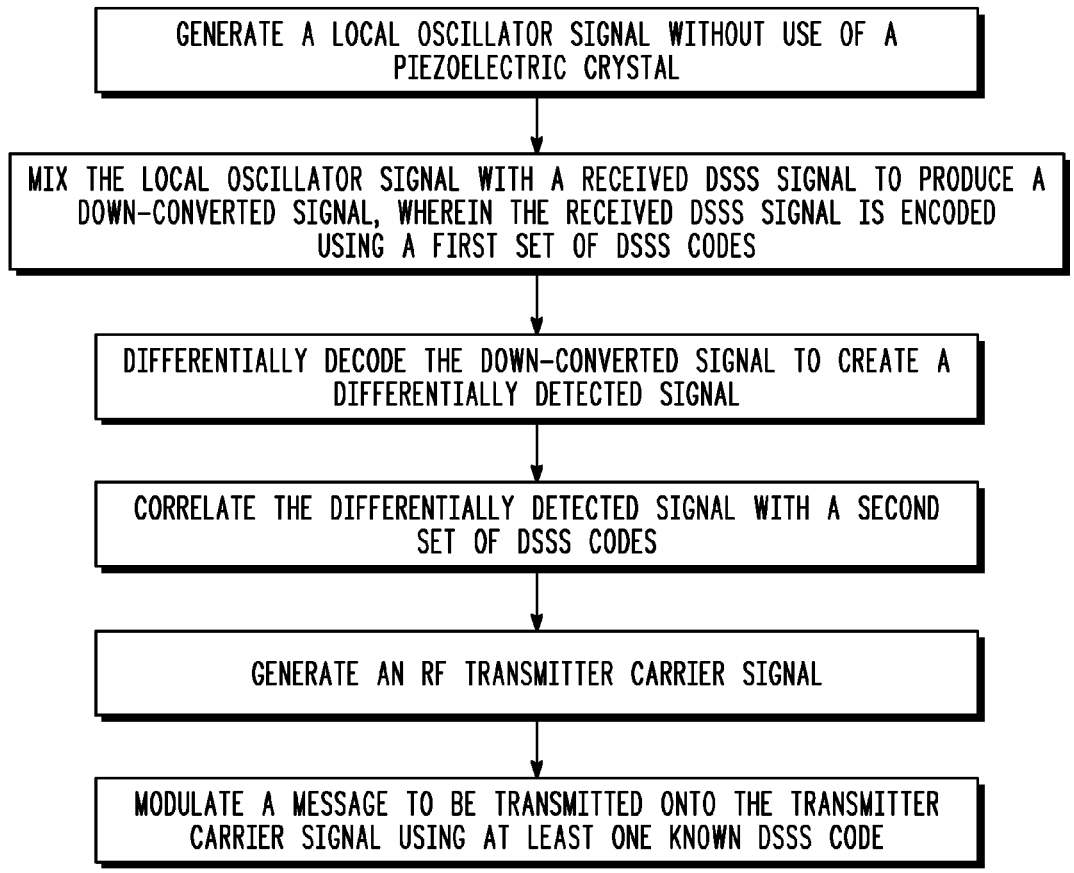
FIG. 7 is a flow diagram of a direct sequence spread spectrum (DSSS) communication method and includes generation of an RF transmitter carrier signal and modulation of a message to be transmitted onto a transmitter carrier signal using at least one known DSSS code, consistent with certain embodiments.
Figure 8:
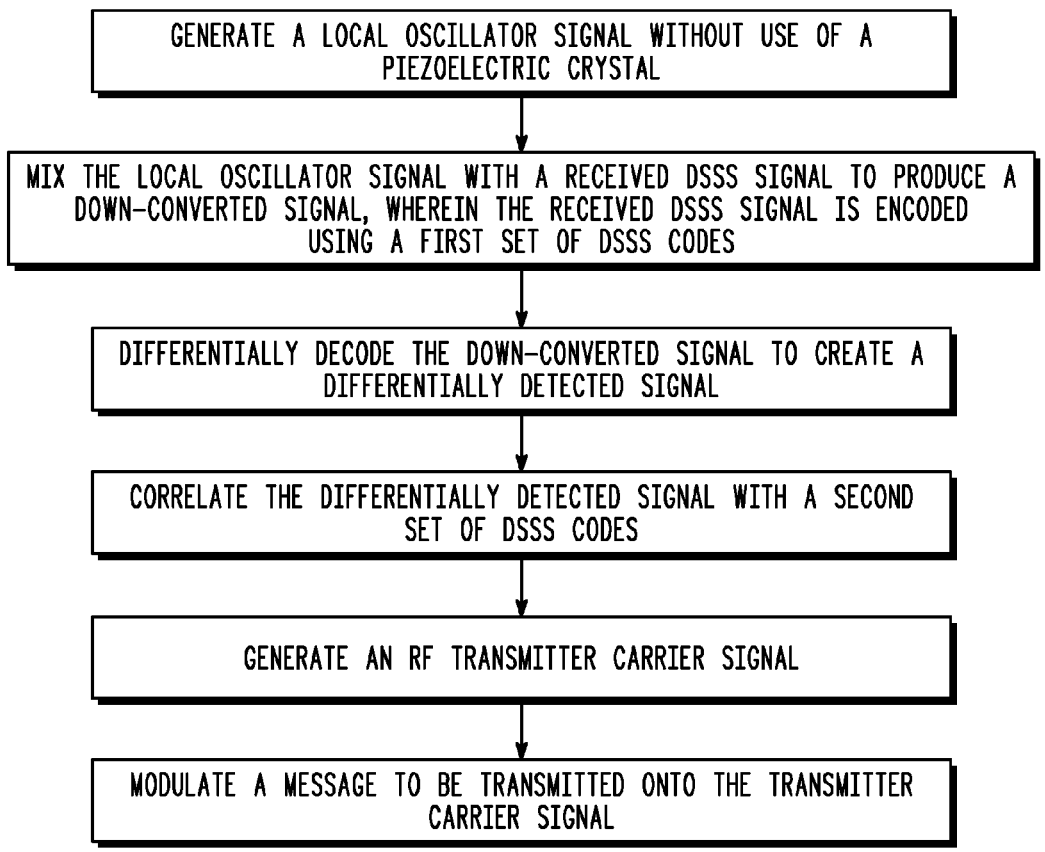
FIG. 8 is a flow diagram of a direct sequence spread spectrum (DSSS) communication method and includes generation of an RF transmitter carrier signal and modulation of a message to be transmitted onto a transmitter carrier signal, consistent with certain embodiments.
Figure 9:
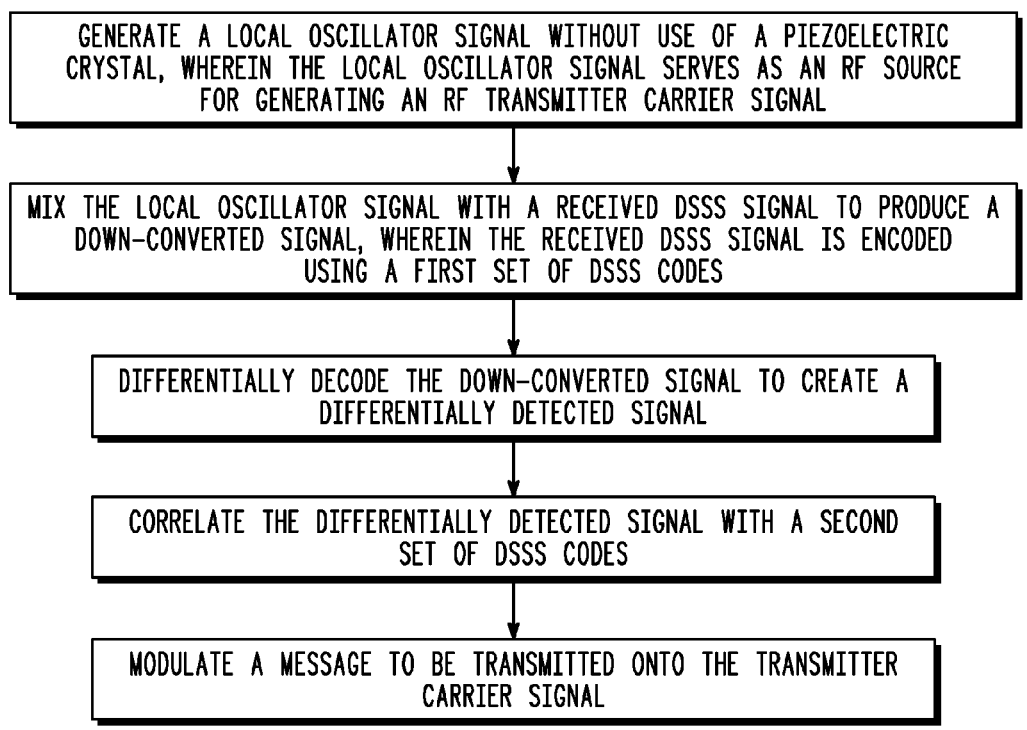
FIG. 9 is a flow diagram of a direct sequence spread spectrum (DSSS) communication method and includes modulation of a message to be transmitted onto the transmitter carrier signal, consistent with certain embodiments.

FIGS., 6-9 illustrate in flow diagram form direct sequence spread spectrum (DSSS) communication methods consistent with certain embodiments, described in detail above. Referring to FIG. 6, a flow diagram 600 is shown. First, a local oscillator signal is generated without use of a piezoelectric crystal. The local oscillator signal is mixed with a received DSSS signal to produce a down-converted signal, wherein the received DSSS signal is encoded using a first set of DSSS codes. The down-converted signal is differentially decoded to create a differentially detected signal. The differentially detected signal is correlated with a second set of DSSS codes. Differentially decoding the down-converted signal to create the differentially detected signal prior to correlating the differentially detected signal with the second set of DSSS codes is operable to mitigate effects of at least one of a frequency offset of the local oscillator signal relative to the received DSSS signal and a phase noise of the frequency generator. FIG. 7 illustrates flow diagram 700 which shows that additionally, an RF transmitter carrier signal is generated and a messaged to be transmitted onto the transmitter carrier signal is modulated using at least one known DSSS code. The flow 800 of FIG. 8 illustrates a method in which using at least one known DSSS code is not specified. The flow 900 of FIG. 9 illustrates that the local oscillator signal may serve as an RF source for generating an RF transmitter carrier signal and further a modulator that modulates a message to be transmitted onto the transmitter carrier signal.

Those skilled in the art will recognize upon consideration of the above disclosure, that certain embodiments consistent with the present invention can be implemented either using specialized hardware or can be realized using a programmed processor (dedicated or general purpose). General purpose computers, microprocessor based computers, micro-controllers, optical computers, analog computers, dedicated processors, Application Specific Integrated Circuits (ASICs) and/or dedicated hard wired logic may be used to construct equivalent embodiments of the present invention.

While certain illustrative embodiments have been described, it is evident that many alternatives, modifications, permutations and variations will become apparent to those skilled in the art in light of the foregoing description.

What is claimed is:

1. A direct sequence spread spectrum (DSSS) communication device, comprising:
    a frequency generator that generates a local oscillator signal without use of a piezoelectric crystal;
    a frequency converter that receives the local oscillator signal and mixes the local oscillator signal with a received DSSS signal to produce a down-converted signal, wherein the received DSSS signal is encoded using a first set of DSSS codes;
    a differential detector that receives the down-converted signal and converts the down-converted signal to a differentially detected signal; and
    a correlator that receives the differentially detected signal and correlates the differentially detected signal with a second set of DSSS codes,
    wherein conversion by the differential detector of the down-converted signal to the differentially detected signal prior to correlation by the correlator of the differentially detected signal with the second set of DSSS codes is operable to mitigate effects of at least one of a frequency offset of the local oscillator signal relative to the received DSSS signal and a phase noise of the local oscillator signal.

2. The DSSS communication device according to claim 1, wherein the second set of DSSS codes are time-shifted from the first set of DSSS codes by an integer number of chip periods.

3. The DSSS communication device according to claim 1, wherein the differentially detected signal comprises output chips which are a function of a plurality of successive chips of the received DSSS signal.

4. The DSSS communication device according to claim 1, wherein the frequency generator has a frequency tolerance of less than approximately $0.12/T$ where T is the period of a chip.

5. The DSSS communication device according to claim 1, wherein the frequency generator comprises one of an inductive-capacitive (LC) type oscillator, a resistive-capacitive (RC) type oscillator, a relaxation oscillator, a ring oscillator and a voltage controlled oscillator.

6. The DSSS communication device according to claim 5, further comprising means for initial adjustment of the frequency of the local oscillator signal.

7. The DSSS communication device according to claim 5, further comprising a compensation circuit that compensates the frequency generator against changes in at least one of temperature or operating voltage.

8. The DSSS communication device according to claim 1, wherein the frequency converter comprises a multiple conversion frequency converter.

9. The DSSS communication device according to claim 1, wherein the down-converted signal comprises a baseband signal.

10. The DSSS communication device according to claim 1, wherein the down-converted signal comprises an intermediate frequency (IF) signal.

11. The DSSS communication device according to claim 1, further comprising:
    an RF source for generating an RF transmitter carrier signal; and
    a DSSS modulator that modulates a message to be transmitted onto the transmitter carrier signal using at least one known DSSS code.

12. The DSSS communication device according to claim 11, wherein the RF source comprises an oscillator that generates the RF transmitter carrier signal without use of a piezoelectric element.

13. The DSSS communication device according to claim 1, wherein the differential detector includes a processor that receives the down-converted signal and produces output chips therefrom which are a function of a plurality of successive chips of the received DSSS signal.

14. The DSSS communication device according to claim 13, wherein the correlator correlates output chips at the output of the processor to at least one DSSS code that has been derived from the received DSSS signal.

15. The DSSS communication device according to claim 1, further comprising:
an RF source that generates a transmitter carrier signal, wherein the RF source comprises an oscillator that generates the RF transmitter carrier signal without use of a piezoelectric element; and
a DSSS modulator which modulates a message to be transmitted onto the transmitter carrier signal using at least one known DSSS code word.

16. The DSSS communication device according to claim 15, wherein the frequency generator comprises one of an inductive-capacitive (LC) type oscillator, a resistive-capacitive (RC) type oscillator, a relaxation oscillator, a ring oscillator and a voltage controlled oscillator.

17. The DSSS communication device according to claim 15, further comprising means for initial adjustment of the frequency of the RF transmitter carrier signal.

18. A direct sequence spread spectrum (DSSS) communication method, comprising:
generating a local oscillator signal without use of a piezoelectric crystal;
mixing the local oscillator signal with a received DSSS signal to produce a down-converted signal, wherein the received DSSS signal is encoded using a first set of DSSS codes;
differentially decoding the down-converted signal to create a differentially detected signal; and
correlating the differentially detected signal with a second set of DSSS codes,
wherein differentially decoding the down-converted signal to create the differentially detected signal prior to correlating the differentially detected signal with the second set of DSSS codes is operable to mitigate effects of at least one of a frequency offset of the local oscillator signal relative to the received DSSS signal and a phase noise of the frequency generator.

19. The DSSS communication method according to claim 18, wherein the second set of DSSS codes is time-shifted from the first set of DSSS codes by an integer number of chip periods.

20. The DSSS communication method according to claim 18, wherein the differentially detected signal comprises output chips which are a function of a plurality of successive chips of the received DSSS signal.

21. The DSSS communication method according to claim 18, wherein the local oscillator signal is generated using one of an inductive-capacitive (LC) type oscillator, a resistive-capacitive (RC) type oscillator, a relaxation oscillator, a ring oscillator and a voltage controlled oscillator.

22. The DSSS communication method according to claim 18, further comprising:
generating an RF transmitter carrier signal; and
modulating a message to be transmitted onto the transmitter carrier signal using at least one known DSSS code.

23. The DSSS communication method according to claim 22, wherein the RF transmitter carrier signal is generated without use of a piezoelectric element.

24. The DSSS communication method according to claim 18, further comprising:
generating an RF transmitter carrier signal; and
modulating a message to be transmitted onto the transmitter carrier signal.

25. The DSSS communication method according to claim 18, wherein:
the local oscillator signal serves as an RF source for generating an RF transmitter carrier signal; and further comprising:
modulating a message to be transmitted onto the transmitter carrier signal.

26. The DSSS communication device according to claim 1, further comprising:
an RF source for generating an RF transmitter carrier signal; and
a modulator that modulates a message to be transmitted onto the transmitter carrier signal.

27. The DSSS communication method according to claim 18, wherein:
the local oscillator signal serves as an RF source for generating an RF transmitter carrier signal; and further comprising:
a modulator that modulates a message to be transmitted onto the transmitter carrier signal.

28. A direct sequence spread spectrum (DSSS) communication device, comprising:
a frequency generator that generates a local oscillator signal without use of a piezoelectric crystal;
a frequency converter that receives the local oscillator signal and mixes the local oscillator signal with a received DSSS signal to produce a down-converted signal, wherein the received DSSS signal is encoded using a first set of DSSS codes;
a differential detector that receives the down-converted signal and converts the down-converted signal to a differentially detected signal, wherein the differentially detected signal comprises output chips which are a function of a plurality of successive chips of the received DSSS signal;
a correlator that receives the differentially detected signal and correlates the differentially detected signal with a second set of DSSS codes;
wherein the frequency generator has a frequency tolerance of less than approximately $0.12/T$ where T is the period of a chip;
an RF source for generating an RF transmitter carrier signal, wherein the RF source comprises an oscillator that generates the RF transmitter carrier signal without use of a piezoelectric element; and
a DSSS modulator that modulates a message to be transmitted onto the transmitter carrier signal using at least one known DSSS code,
wherein conversion by the differential detector of the down-converted signal to the differentially detected signal prior to correlation by the correlator of the differentially detected signal with the second set of DSSS codes is operable to mitigate effects of at least one of a frequency offset of the local oscillator signal relative to the received DSSS signal and a phase noise of the frequency generator.

29. The DSSS communication device according to claim 1, wherein the second set of DSSS codes is a differentially detected set of DSSS codes.

30. The DSSS communication device according to claim 28, wherein the second set of DSSS codes is a differentially detected set of DSSS codes.

31. The DSSS communication device according to claim 15, further comprising a compensation circuit that compensates the RF source against changes in at least one of temperature or operating voltage.

* * * * *